United States Patent
Jeon et al.

(10) Patent No.: US 8,666,545 B2
(45) Date of Patent: Mar. 4, 2014

(54) INTELLIGENT USER INTERFACE APPARATUS AND CONTROL METHOD FOR CONTROL OF SERVICE ROBOTS

(75) Inventors: Jae Wook Jeon, Suwon Si (KR); Tae Houn Song, Chuncheon-si (KR); Soon Mook Jung, Suwon-si (KR); Hyun Uk Jung, Suwon-si (KR); Myung Jin Kim, Suwon-si (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 706 days.

(21) Appl. No.: 12/883,850

(22) Filed: Sep. 16, 2010

(65) Prior Publication Data

US 2011/0071674 A1   Mar. 24, 2011

(30) Foreign Application Priority Data

Sep. 18, 2009   (KR) ........................ 10-2009-0088593

(51) Int. Cl.
    *G06F 19/24*   (2011.01)
(52) U.S. Cl.
    USPC ............... 700/246; 700/245; 700/250; 901/1; 901/50
(58) Field of Classification Search
    USPC .................. 700/245, 246, 250, 253, 257, 264; 701/23–28; 901/1, 50
    See application file for complete search history.

(56) References Cited

U.S. PATENT DOCUMENTS

| | | | |
|---|---|---|---|
| 6,076,025 A * | 6/2000 | Ueno et al. | 701/23 |
| 2006/0173577 A1* | 8/2006 | Takeda et al. | 700/245 |
| 2010/0139995 A1* | 6/2010 | Rudakevych | 180/9.32 |

FOREIGN PATENT DOCUMENTS

| | | |
|---|---|---|
| JP | 2000006068 | 1/2000 |
| KR | 1020090030144 | 2/2009 |

* cited by examiner

*Primary Examiner* — Khoi Tran
*Assistant Examiner* — Spencer Patton
(74) *Attorney, Agent, or Firm* — Lexyoume IP Meister, PLLC

(57) ABSTRACT

Disclosed herein is a user interface apparatus and control method for the control of service robots. The user interface apparatus for the control of service robots includes an interaction server, an index block, and a robot control server. The interaction server receives control commands to control a service robot from a user, analyzes the control commands, and outputs the results of the analysis to the user. The index block determines the degree of difficulty of each of the analyzed control commands. The robot control server determines the operating mode of the service robot depending on the analyzed control command and the degree of difficulty, and controls the service robot in the determined operating mode.

6 Claims, 5 Drawing Sheets

<DEGREE-OF-DIFFICULTY TABLE>

| SERVICE TIME \ SERVICE AREA | Small | Normal | Large |
|---|---|---|---|
| Slow | VE | E | N |
| Normal | E | N | H |
| Fast | N | H | VH |

<DEGREE-OF-SATISFACTION TABLE>

| SERVICE TIME \ SERVICE AREA | Very Low | Low | Normal | High | Very High |
|---|---|---|---|---|---|
| Very Slow | VL | VL | VL | L | N |
| Slow | VL | L | N | N | VH |
| Normal | VL | N | N | N | VH |
| Fast | L | N | N | H | VH |
| Very Fast | N | VH | VH | VH | VH |

FIG. 6

INTELLIGENT USER INTERFACE APPARATUS AND CONTROL METHOD FOR CONTROL OF SERVICE ROBOTS

CROSS-REFERENCE TO RELATED APPLICATION

This application claims priority to and the benefit of Korean Patent Application No. 10-2009-0088593 filed in the Korean Intellectual Property Office on Sep. 18, 2009, the entire contents of which are incorporated herein by reference.

BACKGROUND OF THE INVENTION

1. Field of the Invention

The present invention relates generally to an intelligent user interface apparatus and control method for the control of service robots, and, more particularly, to an intelligent user interface apparatus for the control of service robots which includes a user request analysis module for optimizing the interaction between a robot and a user and a module for numerically analyzing the degrees of satisfaction with services provided by the robot and feeding back analysis results to the user, and an intelligent user interface control method.

2. Description of the Related Art

With the progress of computing power to process a machine language and the improvement of a communication environment, research into service robot technology capable of assisting humans to do housework and improving convenience has been widely and actively carried out. Service robots are different from existing industrial robots which conduct standardized and repetitive work, in that the service robots coexist with humans in the same space and make continual relations with general users having no professional knowledge about robots. Accordingly, the importance of research into interfacing and interaction between humans and service robots has been increasing more and more.

Research into user interfacing was accelerated by an input device which appeared in the 1980s. A user interfacing method using a mouse which appeared in the 1980s brought about the transition from a keyboard and text-based computer user interface to a graphic user interface, which resulted in an innovation that enabled many people to use computers as convenient tools. This graphic user interfacing method has been applied to interfacing methods for industrial robots, and has been widely used in methods of interfacing between humans and robots in many fields up to now.

Since the mid-1990s, thanks to the rapid progress of communication technology and the persistent development of computing power, research into the role of robots transitioning from that of industrial robots which are assigned simple repetitive tasks by a few professionals and conduct the tasks to that of personal service robots which conduct the personal and convenience tasks of general users having no professional knowledge has been actively carried out up to now.

Currently, research into interfacing for personal service robots covers research into a variety of input methods using voices, gestures and/or keywords to improve users' convenience and research into communication and interaction structures for supporting the interaction between humans and robots. In particular, research into the interfacing between humans and robots is very important to robots which coexist with humans in the same space, and aims at implementing the human-friendly interaction based on the mutual reliability between humans and robots. Accordingly, the development of an interface capable of providing functionality of enabling a robot to accurately understand users' commands and increasing the degrees of satisfaction of the users so as to increase the reliability between humans and robots is in demand.

SUMMARY OF THE INVENTION

Accordingly, the present invention has been made keeping in mind the above problems occurring in the prior art, and an object of the present invention is to provide a robot or an information household electronic appliance which includes a user interface capable of analyzing user commands in an active fashion and to provide means and a method which are capable of improving the degrees of satisfaction with services provided by the robot or information household electronic appliance.

In order to accomplish the above object, the present invention provides a user interface apparatus for control of service robots, including an interaction server for receiving control commands to control a service robot from a user, analyzing the control commands, and outputting the results of the analysis to the user; an index block for determining the degree of difficulty of each of the analyzed control commands; and a robot control server for determining the operating mode of the service robot depending on the analyzed control command and the degree of difficulty, and controlling the service robot in the determined operating mode.

The interaction server may include a user command analysis unit for analyzing the control command received from the user; and a command performance result output unit for outputting results of performance of the received control command and the degree of satisfaction with the performance of the control command.

The user command analysis unit may include a voice analysis module for analyzing the control command requested by the user based on a voice received from the user; a facial expression analysis module for analyzing the control command requested by the user based on a facial expression or gesture received from the user in a form of an image; and a keyword analysis module for analyzing the control command requested by the user based on a character string received from the user.

The command performance result output unit may include a work area output module for receiving and outputting data about a work area where the service robot has conducted a service; and a work time output module for receiving and outputting work time for which the service robot has conducted the service.

The robot control server may include an operation control unit for selecting one operating mode from among tele-operating mode in which the service robot receives the control commands directly from the user and is controlled in compliance with the control commands, shared control mode in which the user and the service robot collaborate with each other on work, and full autonomy mode in which the service robot conducts work using a stored program, depending on the degree of difficulty of the control command determined by the index block, and controlling the service robot in the selected operating mode; and a robot control result feedback unit for monitoring status of the service robot.

The index block may include a degree-of-user satisfaction calculation module for receiving service time and a service area from the service robot and calculating the degree of satisfaction of the control command, requested by the user, by applying the service time and service area to an artificial intelligence algorithm.

The index block may include a degree-of-difficulty determination module for determining the degree of difficulty of the control command, requested by the user, by applying service time and a service area, required for performance of the control command input from the user, to an artificial intelligence algorithm.

The index block may include a degree-of-difficulty re-evaluation module for determining the degree of difficulty of the control command, requested by the user, by applying a difference between the degree of current user satisfaction calculated using data acquired from the service robot currently at work and the degree of user satisfaction to an artificial intelligence algorithm. The robot control server may re-determine the operating mode of the service robot according to the re-determined degree of difficulty, and controls the service robot.

Additionally, in order to accomplish the above object, the present invention provides a user interface control method for control of service robots, including receiving control commands to control a service robot from a user, analyzing the control commands, and determining the degree of difficulty of each of the analyzed control commands; determining operating mode of the service robot according to the analyzed control command and the degree of difficulty, and controlling the service robot in the operating mode so that the service robot conducts the control command; and monitoring results of performance of the control command conducted by the service robot, calculating the degree of satisfaction with the performance of the control command using the results of the performance of the control command, and outputting the degree of satisfaction.

the analyzing the control commands may include analyzing the control command of the user by analyzing at least one of a voice received from the user, a facial expression and a gesture received from the user in a form of an image, and a character string received from the user.

The outputting the degree of satisfaction may include additionally outputting data about a work area where the service robot has conducted a service and data about work time for which the service robot has conducted the service.

The determining operating mode of the service robot according to the analyzed control command and the degree of difficulty may include selecting one operating mode from among tele-operating mode in which the service robot receives the control commands directly from the user and is controlled in compliance with the control commands, shared control mode in which the user and the service robot collaborate with each other on work, and full autonomy mode in which the service robot conducts work using a stored program, depending on the determined degree of difficulty of the control command.

The calculating the degree of satisfaction with the performance of the control command using the results of the performance of the control command may include receiving service time and a service area from the service robot and calculating the degree of satisfaction of the control command, requested by the user, by applying the service time and service area to an artificial intelligence algorithm.

The determining the degree of difficulty of each of the analyzed control commands may include determining the degree of difficulty of the control command, requested by the user, by applying service time and a service area, required for performance of the control command input from the user, to an artificial intelligence algorithm.

The user interface control method may further include determining the degree of difficulty of the control command, requested by the user, by applying a difference between the degree of current user satisfaction calculated using data acquired from the service robot currently at work and the degree of user satisfaction to an artificial intelligence algorithm; and re-determining the operating mode of the service robot according to the re-determined degree of difficulty, and controlling the service robot.

BRIEF DESCRIPTION OF THE DRAWINGS

The above and other objects, features and advantages of the present invention will be more clearly understood from the following detailed description taken in conjunction with the accompanying drawings, in which:

FIG. 6 is a degree-of-satisfaction table according to the present invention, which is used to calculate the degrees of user satisfaction for control commands input by a user.

DESCRIPTION OF THE PREFERRED EMBODIMENTS

Figure 1:
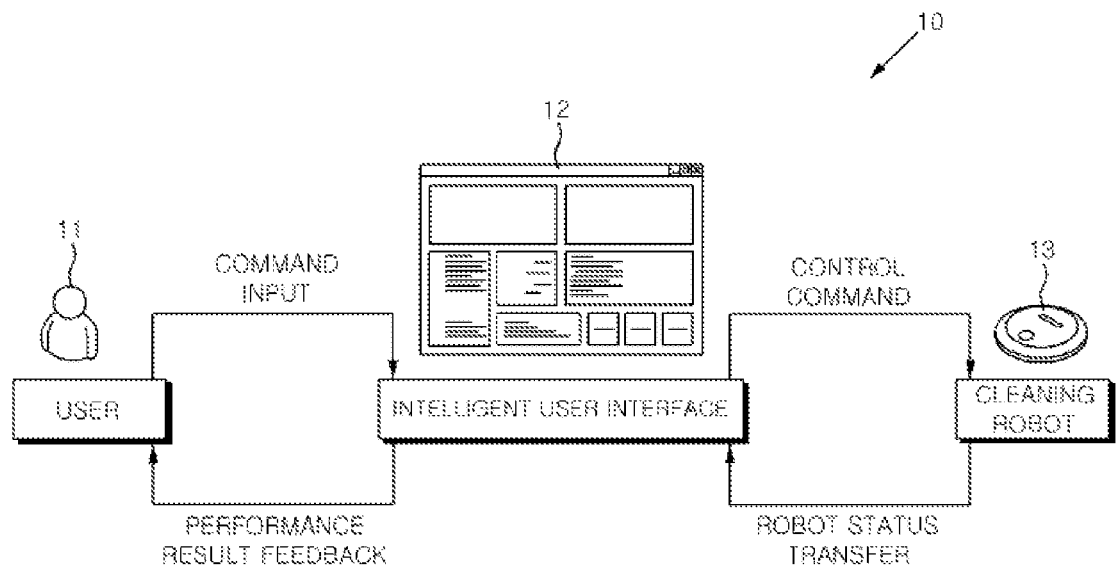
FIG. 1 is a diagram showing the configuration of an intelligent user interface system for the control of a service robot according to an embodiment of the present invention.

Reference now should be made to the drawings, in which the same reference numerals are used throughout the different drawings to designate the same or similar components.

An intelligent user interface apparatus and control method for the control of a cleaning robot according to the present invention will be described in detail below with reference to the accompanying drawings.

FIG. 1 is a diagram showing the configuration of an intelligent user interface system 10 for the control of a service robot according to an embodiment of the present invention.

Referring to FIG. 1, the intelligent user interface system 10 for efficiently managing a robot according to the embodiment of the present invention operates via the interaction between a user 11, an intelligent user interface 12, and a cleaning robot 13.

The user 11 inputs commands to the intelligent user interface 12. The cleaning robot 13 provides services to the user 11 in compliance with the commands of the user 11. However, the present invention is not limited to the cleaning robot 13. That is, it is apparent that the intelligent user interface apparatus and control method according to the present invention can be applied to service robots having predetermined service areas and times, such as welding robots and Automatic Guided Vehicles (AGVs), instead of the cleaning robot 13.

The intelligent user interface 12 is a component for controlling the cleaning robot 13 in compliance with input commands. In the reverse direction, the intelligent user interface 12 receives the current status of the cleaning robot 13 from the cleaning robot 13, and outputs the results of performance of the control commands issued by the user 11.

The above-described interaction between the user 11, the intelligent user interface 12, and the cleaning robot 13 allows the user 11 to control the cleaning robot 13 more efficiently.

Figure 2:
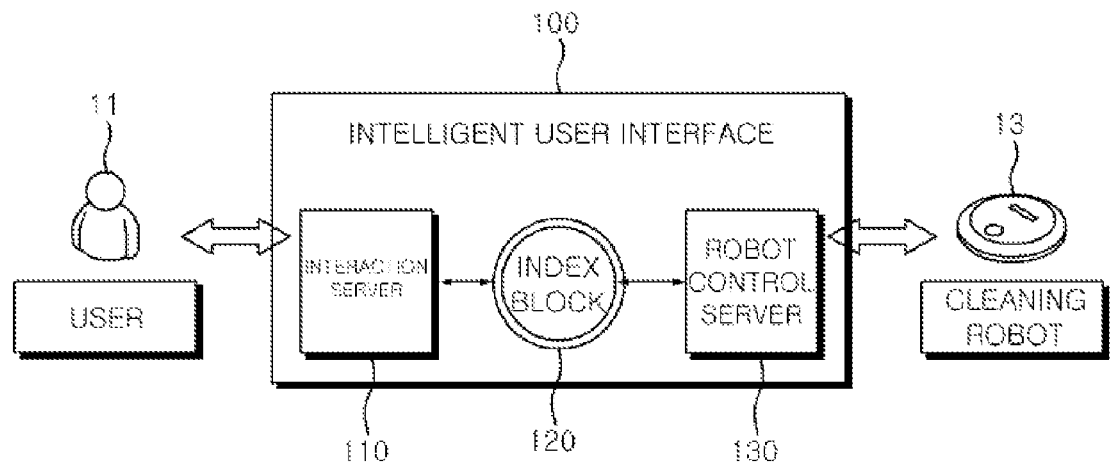
FIG. 2 is a block diagram showing the configuration of the intelligent user interface shown in FIG. 1.

FIG. 2 is a block diagram showing the configuration of the intelligent user interface 100 shown in FIG. 1.

Referring to FIG. 2, the intelligent user interface 100 according to the present invention may include an interaction server 110, an index block 120, and a robot control server 130. These components now will be described.

The interaction server 110 functions to receive commands from the user 11 and to feed back the results of the performance of the commands to the user 11.

The index block 120 determines cleaning robot control commands and the degrees of difficulty corresponding to the commands input by the user 11. Furthermore, the index block 120 also stores service results and data to be fed back, which are transmitted from the cleaning robot 13.

The robot control server 130 determines the operating modes of the cleaning robot 13 depending on the degrees of difficulty determined by the index block 120, and causes the cleaning robot 13 to provide services while exchanging commands or data with the cleaning robot 13. Furthermore, the robot control server 130 performs operations such as monitoring the status of the cleaning robot 13.

Figure 3:
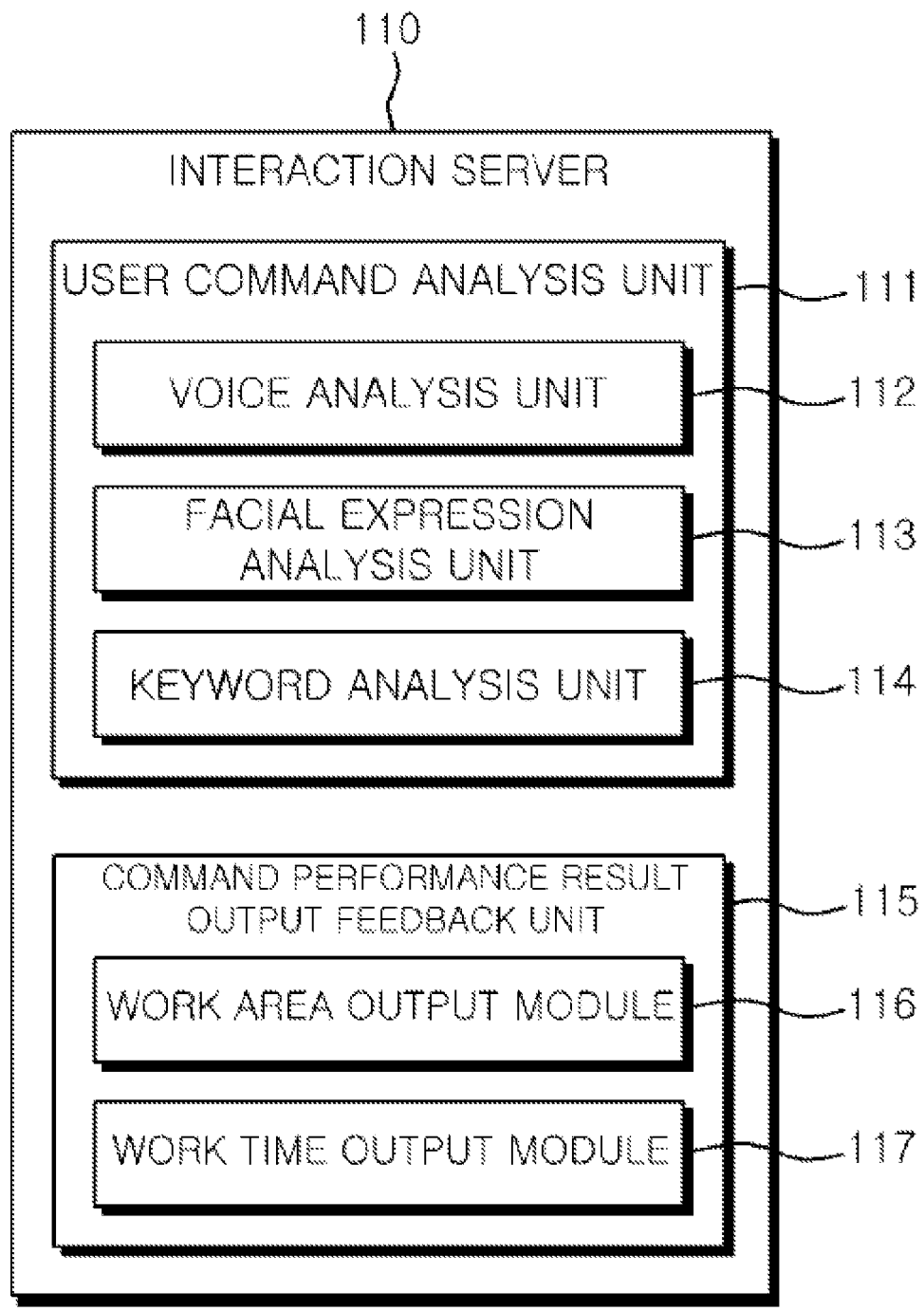
FIG. 3 is a detailed block diagram showing the interaction server included in the intelligent user interface of FIG. 2.

FIG. 3 is a detailed block diagram showing the interaction server included in the intelligent user interface of FIG. 2.

As shown in FIG. 3, the interaction server 110 may include a user command analysis unit 111 and a command performance result output unit 115. Here, the user command analysis unit 111 may include a voice analysis module 112, a facial expression analysis module 113, and a keyword analysis module 114. Meanwhile, the command performance result output unit 115 may include a work area output module 116 and a work time output module 117.

The voice analysis module 112 is a module for analyzing a service requested by a user using a voice. The facial expression analysis module 113 is a module for receiving a user's facial expression and gesture in the form of an image and analyzing a service requested by a user using the image. The keyword analysis module 114 is a module for receiving characters having a meaning, such as a keyword, from a user and analyzing a service requested by a user using the characters.

Meanwhile, the command performance result output unit 115 is a component for feeding back the results of the service of the cleaning robot 13 to a user. The work area output module 116 receives a work area where the cleaning robot 13 has performed a service and outputs the results, while the work time output module 117 receives work time which is taken by the cleaning robot 13 to perform a service and outputs the results.

Figures 4, 5:
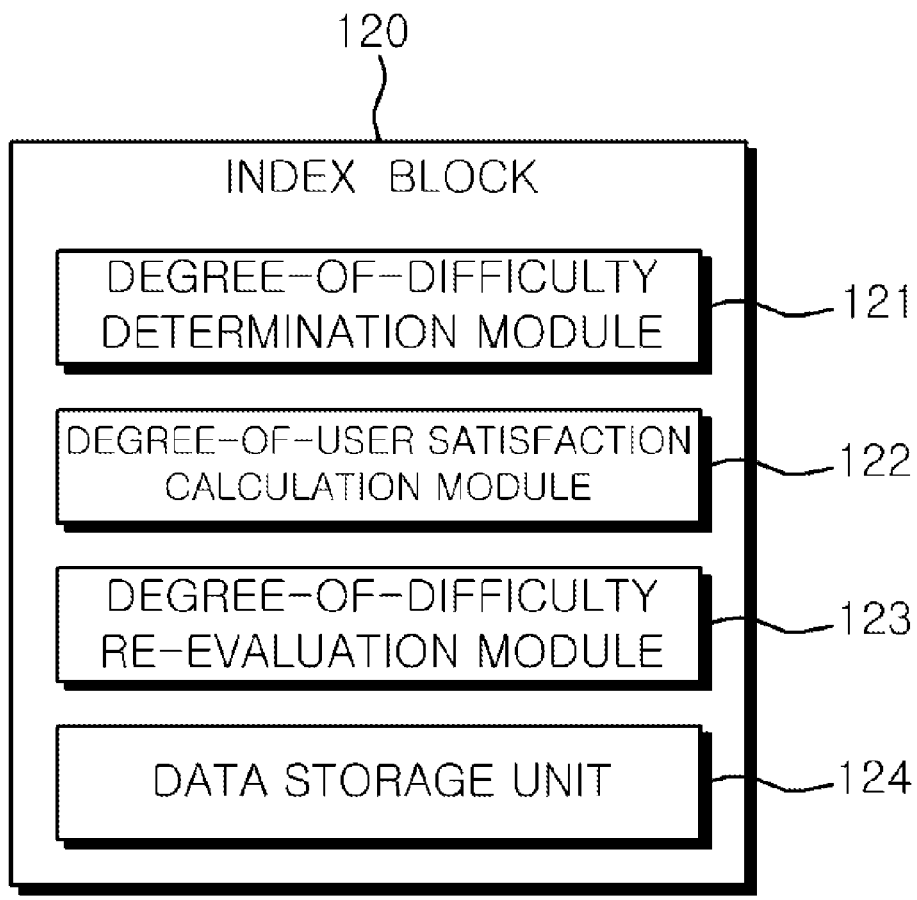
FIG. 4 is a detailed block diagram showing the index block included in the intelligent user interface of FIG. 2.
FIG. 5 is a degree-of-difficulty table according to the present invention, which is used to determine the degrees of difficulty of control commands input by a user.

FIG. 4 is a detailed block diagram showing the index block included in the intelligent user interface of FIG. 2.

As shown in FIG. 4, the index block 120 of the intelligent user interface 100 may include a degree-of-difficulty determination module 121, a degree-of-user satisfaction calculation module 122, a degree-of-difficulty re-evaluation module 123, and a data storage unit 124.

The degree-of-difficulty determination module 121 of FIG. 4 calculates the degree of difficulty of a control command, requested by a user, by applying an artificial intelligence algorithm to the size of a space and the time required to perform the control command input by the user. This will be described in detail using the degree-of-difficulty table of FIG. 5.

Here, the degree-of-difficulty determination module 121 may determine the degrees of difficulty by referring to the results of the performance of existing control commands, that is, the control command performance times and the required times stored as the results of the performance of previous control commands, stored in the data storage unit 124.

The degree-of-user satisfaction calculation module 122 of FIG. 4 calculates the degree of user satisfaction with a service requested by the user using data acquired from the robot control result feedback unit 132 of the robot control server 130. This will be described in more detail using the degree-of-satisfaction table of FIG. 6.

The degree-of-difficulty re-evaluation module 123 re-evaluates or updates the degree of difficulty of a control command, requested by a user, based on the difference between the degree of current satisfaction and the degree of user satisfaction using data fed back from the cleaning robot 13 currently at work. When the degree of difficulty has been re-evaluated or updated as described above, the operating mode of the cleaning robot 13 may also be changed by the operation control unit 131. This will be described in more detail using the degree of satisfaction update table of FIG. 7.

The data storage unit 124 stores the mapping relationship between control commands input by a user and the degrees of difficulty and the mapping relationship between control commands input by the user and the degrees of satisfaction. Additionally, the data storage unit 124 may store information for evaluating the degrees of difficulty and information for evaluating the degrees of satisfaction.

FIG. 5 is a degree-of-difficulty table according to the present invention, which is used to determine the degrees of difficulty of control commands input by a user.

The degree-of-difficulty determination module 121 of FIG. 4 acquires the service time and service area which are required to perform each control command analyzed by at least one of the voice analysis module 112, facial expression analysis module 113 and keyword analysis module 114 of the user command analysis unit 111, which was described in detail in conjunction with FIG. 3.

Thereafter, the degree-of-difficulty determination module 121 determines the degree of difficulty of the command requested by the user by mapping information about the acquired service time and the service area to the table of FIG. 5.

From the degree-of-difficulty table of FIG. 5, it can be seen that the degrees of difficulty of user commands may be classified into VE (Very Easy), E (Easy), N (Normal), H (Hard), and VH (Very Hard).

Furthermore, the service time (Time) may be classified into Slow, Normal, and Fast, and the service area (Area) may be classified into Small, Normal, and Large.

For example, if the service time is Fast and the service area is Normal, the degree-of-difficulty determination module 121 determines the degree of difficulty of a command requested by a user to be H (Hard).

In particular, it is preferred that the degree-of-difficulty determination module 121 according to the present invention determine the degrees of difficulty of user commands using an artificial intelligence algorithm, such as fuzzy rules, a genetic algorithm, or a neural network. For example, the degree-of-difficulty determination module 121 according to the present invention may evaluate a service area and a service time as 0 (easiest) and 1 (hardest), and calculate the degree of difficulty of each control command by applying the results to fuzzy rules.

The degree of difficulty of the control command calculated using fuzzy rules is transferred to the operation control unit 131 of the robot control server 130, and the operation control unit 131 may determine the operating mode (tele-operation mode, shared control mode, or full autonomy mode) of the cleaning robot 13 based on the transferred degree of difficulty.

FIG. 6 is a degree-of-satisfaction table according to the present invention, which is used to calculate the degrees of user satisfaction for control commands input by a user.

The degree-of-user satisfaction calculation module 122 of FIG. 4 calculates the degrees of user satisfaction by applying data about the results of service performance, acquired from the robot control result feedback unit 132 of the robot control server 130 of FIG. 8, to the degree-of-satisfaction table of FIG. 6.

As seen from the degree-of-satisfaction table of FIG. 6, the degrees of user satisfaction may be classified into VL (Very Low), L (Low), N (Normal), H (High), and VH (Very High).

Meanwhile, variables used to determine the degree of user satisfaction include the time it took to provide a service and the area where the service was provided. The service time may be classified as Very Slow, Slow, Normal, Fast, or Very Fast. Furthermore, the service area may be classified as Very Small, Small, Normal, Large, or Very Large.

Figure 7:
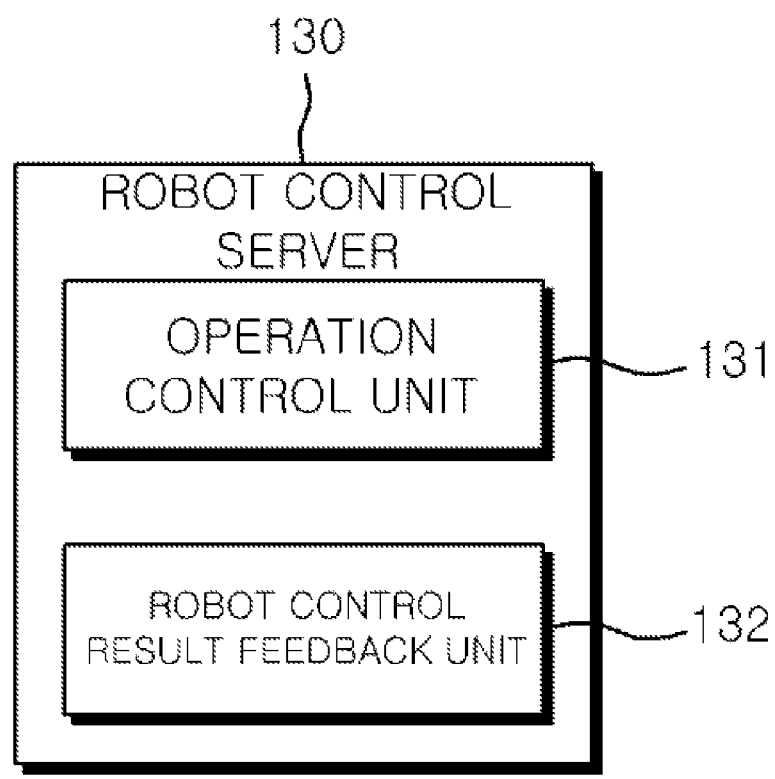
FIG. 7 is a detailed block diagram showing the robot control server included in the intelligent user interface of FIG. 2.

For example, if the degree-of-user satisfaction calculation module 122 receives Fast for the service time and Normal for the service area from the robot control result feedback unit 132 of FIG. 7, it determines the degree of satisfaction for a user command to be N (Normal).

In this case, it is preferred that the degree-of-user satisfaction calculation module 122 according to the present invention determine the degrees of satisfaction for user commands using an artificial intelligence algorithms, such as fuzzy rules, a genetic algorithm, or a neural network. For example, the degree-of-user satisfaction calculation module 122 according to the present invention may calculate the degree of satisfaction using fuzzy rules in which the highest satisfaction with each of the service time and the service area is set to 0 and the least satisfaction with it is set to 1.

The degree of user satisfaction calculated as described above is fed back to the command performance result output unit 115 of the interaction server 110 of FIG. 3, and can be then output to the user 11. It is apparent that the user 11 can refer to the feedback degree of satisfaction when issuing the next command.

FIG. 7 is a detailed block diagram showing the robot control server included in the intelligent user interface of FIG. 2.

As shown in FIG. 8, the robot control server 130 may include an operation control unit 131 for controlling the operation of the cleaning robot 13 and a robot control result feedback unit 132 for monitoring the status of the cleaning robot 13.

The operation control unit 131 of FIG. 7 determines the operating mode of the cleaning robot 13 by referring to the degree of difficulty determined in conjunction with FIG. 5. The operating mode of the cleaning robot 13 includes a tele-operating mode in which commands are received directly from a user and a robot is directly operated in compliance with the commands, shared control mode in which a service is implemented by collaboration between a user and a robot, and full autonomy mode in which a robot autonomously performs work using a stored program.

For example, the operation control unit 131 of FIG. 7 causes the cleaning robot 13 to operate in full autonomy mode if the degree of difficulty of a command input by a user is VE, E, or N, in shared control mode if the degree of difficulty is H, and tele-operation mode if the degree of difficulty is VH. It is apparent that there are various methods of determining the operating mode depending on the degree of difficulty.

Furthermore, the operation control unit 131 may determine the moving speed of the cleaning robot 13 according to the determined degree of difficulty.

Meanwhile, the robot control result feedback unit 132 of the robot control server 130 of FIG. 7 monitors the status of the cleaning robot 13, such as the location, service performance status, performance time, and battery status of the cleaning robot 13. The robot control result feedback unit 132 transfers acquired result data to the interaction server 110 and the index block 120.

As described above, the intelligent user interface apparatus and control method for the control of service robots according to the present invention are configured to provide input methods using voice commands, facial expression and gesture recognition and keyword command, which are more various and convenient than existing input methods using a cleaning mode selection button.

Furthermore, robot control mode can be selected from among tele-operation mode, shared control mode and full autonomy mode depending on the degree of difficulty of each user command, so that these various types of mode can improve QoS and the degree of satisfaction, compared to the robot autonomous mode which is applied to existing cleaning robots.

Moreover, the user interface apparatus according to the present invention is configured to numerically calculate the degree of satisfaction with a service provided in compliance with a command requested by a user and to provide feedback to a user, thereby enabling reliable interaction between the user and a service robot.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A user interface apparatus for control of service robots, comprising:
   an interaction server for receiving a control command to control a service robot from a user, analyzing the control command, and outputting a result of the analysis to the user;
   an index block for determining a degree of difficulty of the analyzed control command; and
   a robot control server for determining an operating mode of the service robot depending on the analyzed control command and the degree of difficulty, and controlling the service robot in the determined operating mode,
   wherein the index block comprises a degree-of-difficulty determination module for determining the degree of difficulty of the control command, requested by the user, by applying service time and a service area, required for performance of the control command input from the user, to an artificial intelligence algorithm.

2. The user interface apparatus as set forth in claim 1, wherein the interaction server comprises:
   a user command analysis unit for analyzing the control command received from the user; and
   a command performance result output unit for outputting results of performance of the received control command and a degree of satisfaction with the performance of the control command.

3. The user interface apparatus as set forth in claim 2, wherein the user command analysis unit comprises:
   a voice analysis module for analyzing the control command requested by the user based on a voice received from the user;
   a facial expression analysis module for analyzing the control command requested by the user based on a facial expression or gesture received from the user in a form of an image; and a keyword analysis module for analyzing the control command requested by the user based on a character string received from the user.

4. The user interface apparatus as set forth in claim 2, wherein the command performance result output unit comprises:
a work area output module for receiving and outputting data about a work area where the service robot has conducted a service; and
a work time output module for receiving and outputting work time for which the service robot has conducted the service.

5. The user interface apparatus as set forth in claim 1, wherein the robot control server comprises:
an operation control unit for selecting one operating mode from among tele-operating mode in which the service robot receives the control command directly from the user and is controlled in compliance with the control command, shared control mode in which the user and the service robot collaborate with each other on work, and full autonomy mode in which the service robot conducts work using a stored program, depending on the degree of difficulty of the control command determined by the index block, and controlling the service robot in the selected operating mode; and
a robot control result feedback unit for monitoring a status of the service robot.

6. The user interface apparatus as set forth in claim 1, wherein the index block comprises a degree-of-user satisfaction calculation module for receiving service time and a service area from the service robot and calculating a degree of satisfaction of the control command, requested by the user, by applying the service time and service area to an artificial intelligence algorithm.

* * * * *